United States Patent [19]

Boyer

[11] Patent Number: 5,114,060
[45] Date of Patent: May 19, 1992

[54] RADAR DETECTOR MOUNTING APPARATUS

[76] Inventor: Robert Boyer, Box 533, Bisbee, Ariz. 85603

[21] Appl. No.: 565,146

[22] Filed: Aug. 10, 1990

[51] Int. Cl.⁵ .............................. B62J 7/00; B62J 7/06
[52] U.S. Cl. ................................ 224/32 R; 224/30 A; 224/36
[58] Field of Search ..................... 224/30 A, 32 R, 36, 224/41; 342/20; 206/305

[56] References Cited

U.S. PATENT DOCUMENTS

| | | | |
|---|---|---|---|
| 2,327,537 | 8/1943 | Lyman | 224/36 |
| 4,322,835 | 3/1982 | Ernst et al. | 206/305 |
| 4,445,228 | 4/1984 | Bruni | 224/41 |
| 4,458,813 | 7/1984 | Tuchinsky et al. | 206/305 |
| 4,631,542 | 12/1986 | Grimsley | 342/20 |
| 4,725,840 | 2/1988 | Orazietti | 342/20 |
| 4,800,664 | 1/1989 | Marstall | 224/30 A |
| 4,981,243 | 1/1991 | Rogowski | 224/36 |

Primary Examiner—Renee S. Luebke
Assistant Examiner—David J. Walczak
Attorney, Agent, or Firm—James E. Brunton

[57] ABSTRACT

An apparatus for securely mounting a compact, commercially available radar detector unit on either the handlebars or fairing of a motorcycle. The apparatus provides a sealed chamber, including a shock absorbing manner, for removably receiving the detector unit. When the apparatus is mounted on the motorcycle handlebars, a mounting assembly is provided which permits the unit to be positioned in various angular orientations. This enables the apparatus to be used on motorcycles with handlbars having widely varying rake angles.

13 Claims, 4 Drawing Sheets

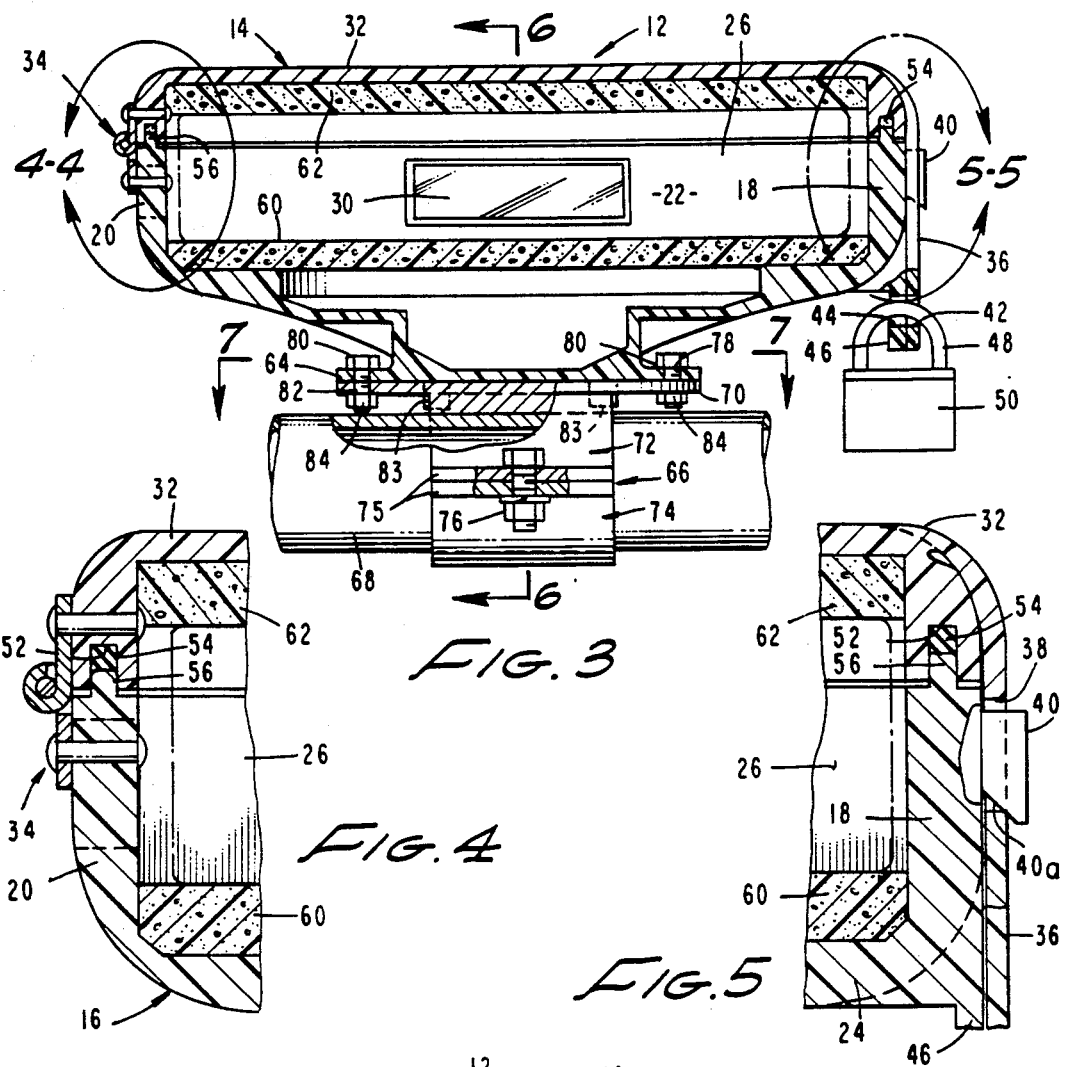

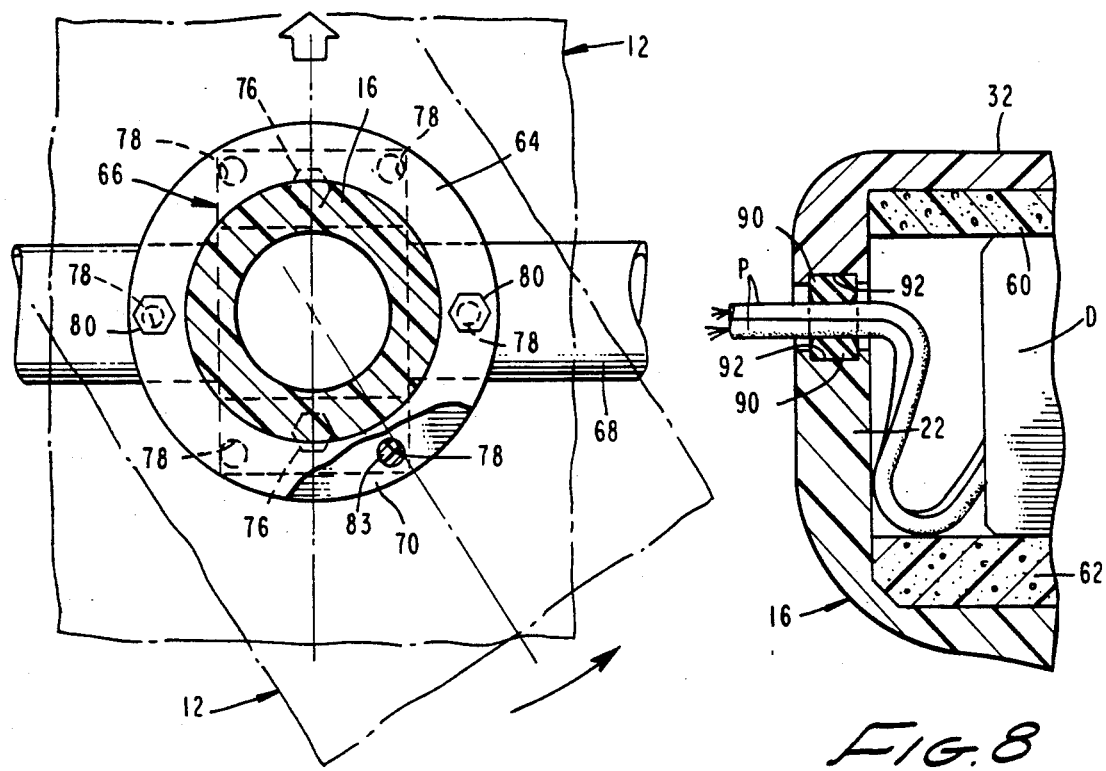
FIG. 7
FIG. 8
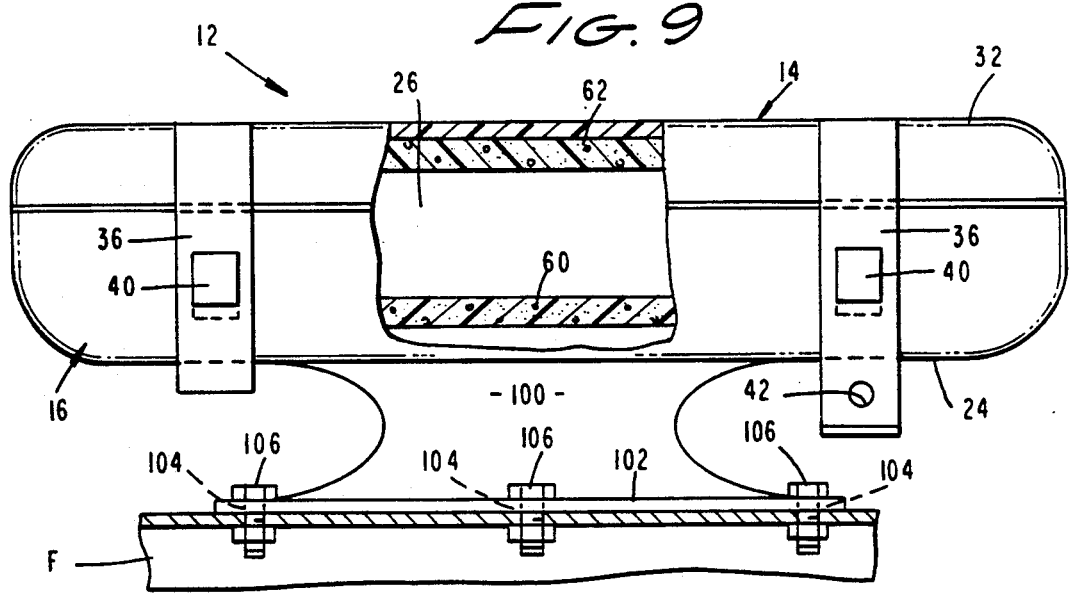
FIG. 9

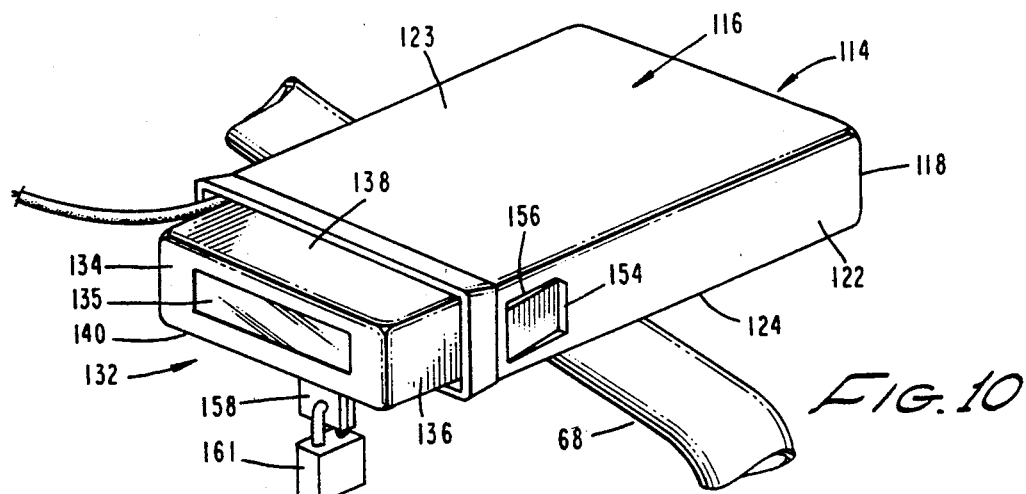
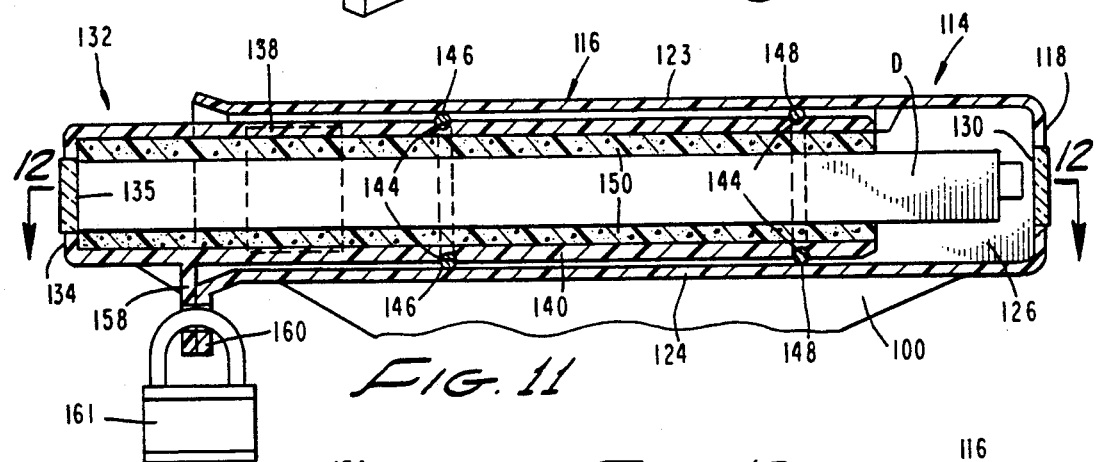
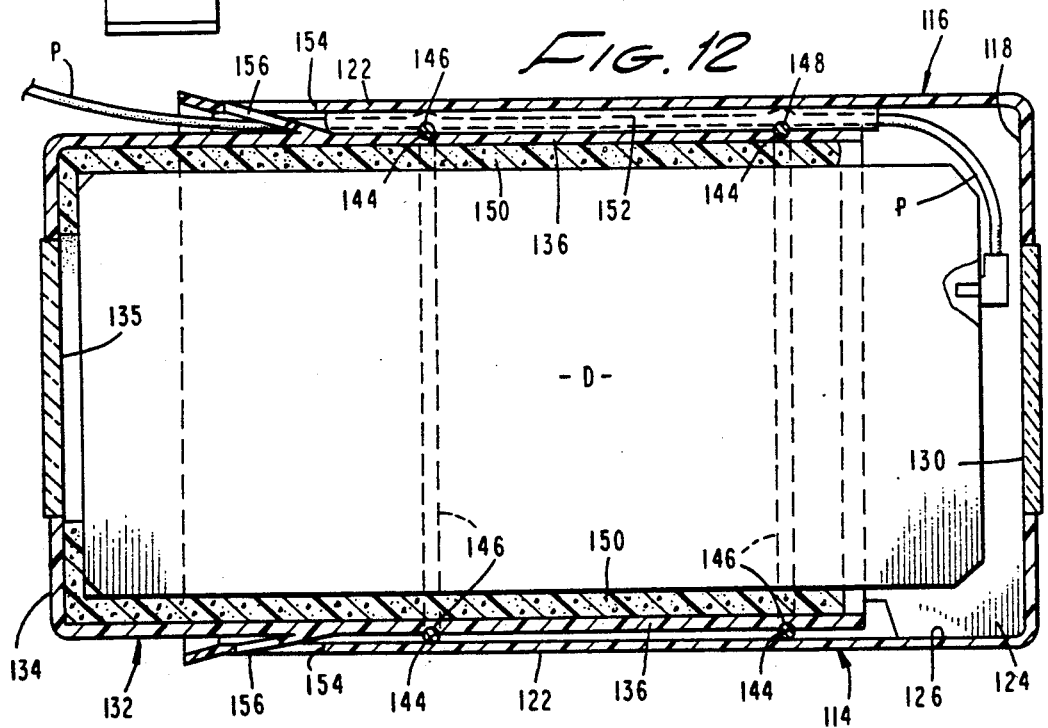

RADAR DETECTOR MOUNTING APPARATUS

BACKGROUND OF THE INVENTION

1. Field of the Invention

The present invention relates generally to a mounting apparatus for mounting electronic devices on vehicles. More particularly, the invention concerns an apparatus for mounting a compact radar detection unit on either the fairing or handlebars of a motorcycle.

2. Discussion of the Invention

In recent years law enforcement agencies have widely adopted radar devices for use in enforcing speed control laws. Such devices are typically mounted in police cars and are used to obtain a direct read out of the speed of both on coming and passing vehicles.

With the increased use by the police of radar devices, radar detector units for detecting the presence of police radar devices have become increasingly popular with motorists. These devices are typically quite small, can be operated by the vehicle's electrical system, and are frequently mounted on the visor or dashboard of the automobile. When radar signals emitted by the police radar devices are sensed by the detector, an alarm such as a visual or audio signal is emitted by the detector unit. The range of the units are usually sufficient to enable the motorist to decrease speed prior to reaching the location of the police radar device.

Many types of radar detection devices are commercially available. These devices are usually quite small and lightweight and can be easily connected to the automobile electrical system by a built-in power cord. Typical of the many commercially available radar detection units is a unit sold by Radio Shack under catalog no. 22-1626. This device is 11/16 by 3⅛ by 4½ inches in size and emits both audio and visual alarms upon detection of a radar signal. The device is provided with a power cord having a lighter socket plug and can be mounted on the automobile dashboard or visor.

Most commercially available radar detection units are adapted for use within the passenger compartment of an automobile and are generally unsuited for use with motorcycles, wherein the unit is exposed to hostile environments. The thrust of the present invention is to provide an apparatus for securely mounting a commercially available radar detection unit on a motorcycle in such a manner that the unit is at all times protected from rain, dust, shock and vibration. The apparatus of the invention is uniquely designed so that the radar detection unit can be readily installed within a hermetically sealed chamber and can be easily removed therefrom for normal use with a passenger vehicle. The mounting apparatus of the invention enables the positioning of the radar detection unit in various orientations. Accordingly, the apparatus of the invention can be selectively mounted on motorcycles having handlebars with widely varying rake angles.

SUMMARY OF THE INVENTION

It is an object of the present invention to provide an apparatus for securely mounting a commercially available radar detection unit on either the fairing or handlebars of a motorcycle.

It is another object of the invention to provide an apparatus of the aforementioned character in which the radar detection unit is installed within an interior chamber wherein it is protected from hostile environmental conditions such as rain, dust, shock and vibration.

Another object of the invention is to provide an apparatus as described in the preceding paragraphs within which the radar detection unit can be easily installed and removed as desired.

Another object of the invention is to provide an apparatus of the character described which is adjustably mounted on the motorcycle so that the orientation of the detector unit with respect to the handlebars of the motorcycle, can be selectively varied.

Still another object of the invention is to provide an apparatus for mounting a radar detection unit on virtually any type of motorcycle and one which includes anti-theft features to prevent theft of the detection unit.

Another object of the invention is to provide an apparatus of the character described in which the detector unit is contained within a closed housing that is provided with a first window that allows the unit to detect radar signals being emitted from a remote radar device and a second window that enables the rider to see visual signals given by the unit.

Yet another object of the invention is to provide an apparatus as described in the preceding paragraph in which the closed housing is also provided with a sealed power cord exit and with an audio signal exit that permits the rider to hear audio signals emitted by the unit.

Another object of the invention is to provide an apparatus of the class described which is durable, compact, lightweight, easy to use and inexpensive to manufacture.

BRIEF DESCRIPTION OF THE DRAWINGS

FIG. 3 is a cross sectional view taken along lines 3—3 of FIG. 1.

FIG. 4 is a fragmentary, cross sectional view taken in the area designated by the numerals 4—4 in FIG. 3, FIG. 5 is a fragmentary, cross sectional view taken in the area designated in FIG. 3 by the numerals 5—5.

FIG. 6 is a cross sectional view taken along lines 6—6 of FIG. 3.

FIG. 7 is a cross sectional view taken along lines 7—7 of FIG. 3.

FIG. 8 is a fragmentary, cross sectional view of the power cord outlet portion of the housing of the apparatus of the invention.

FIG. 9 is a front view of an alternate, fairing mount form of the apparatus of the present invention partially broken away to show internal construction.

FIG. 10 is a generally perspective view of still another embodiment of the present invention.

FIG. 11 is an enlarged side elevational, cross-sectional view of the embodiment of the invention shown in FIG. 10.

FIG. 12 is a cross-sectional view taken along lines 12—12 of FIG. 11.

DESCRIPTION OF THE INVENTION

Figure 1:
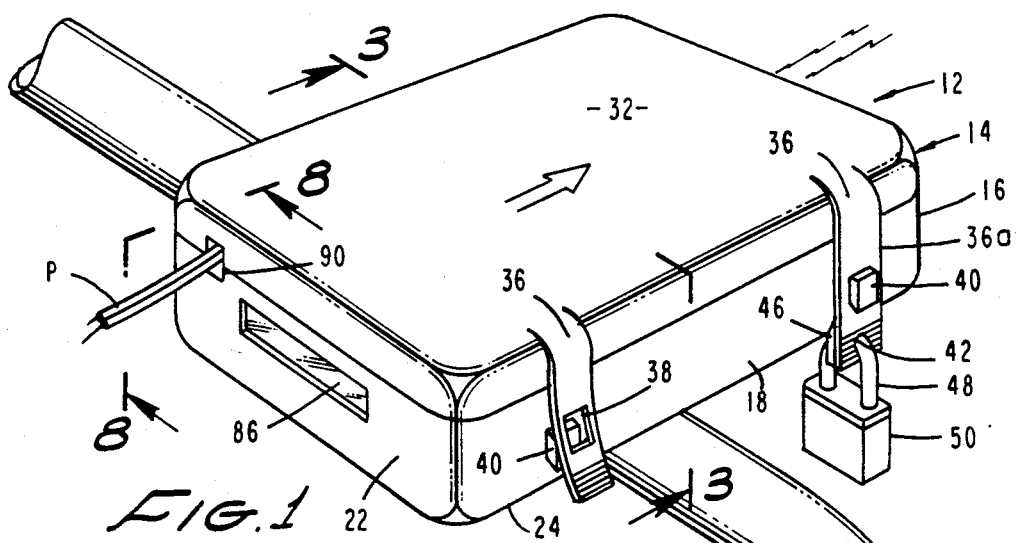
FIG. 1 is a generally perspective view of one form of the radar detector mounting apparatus of the present invention.
Figure 2:
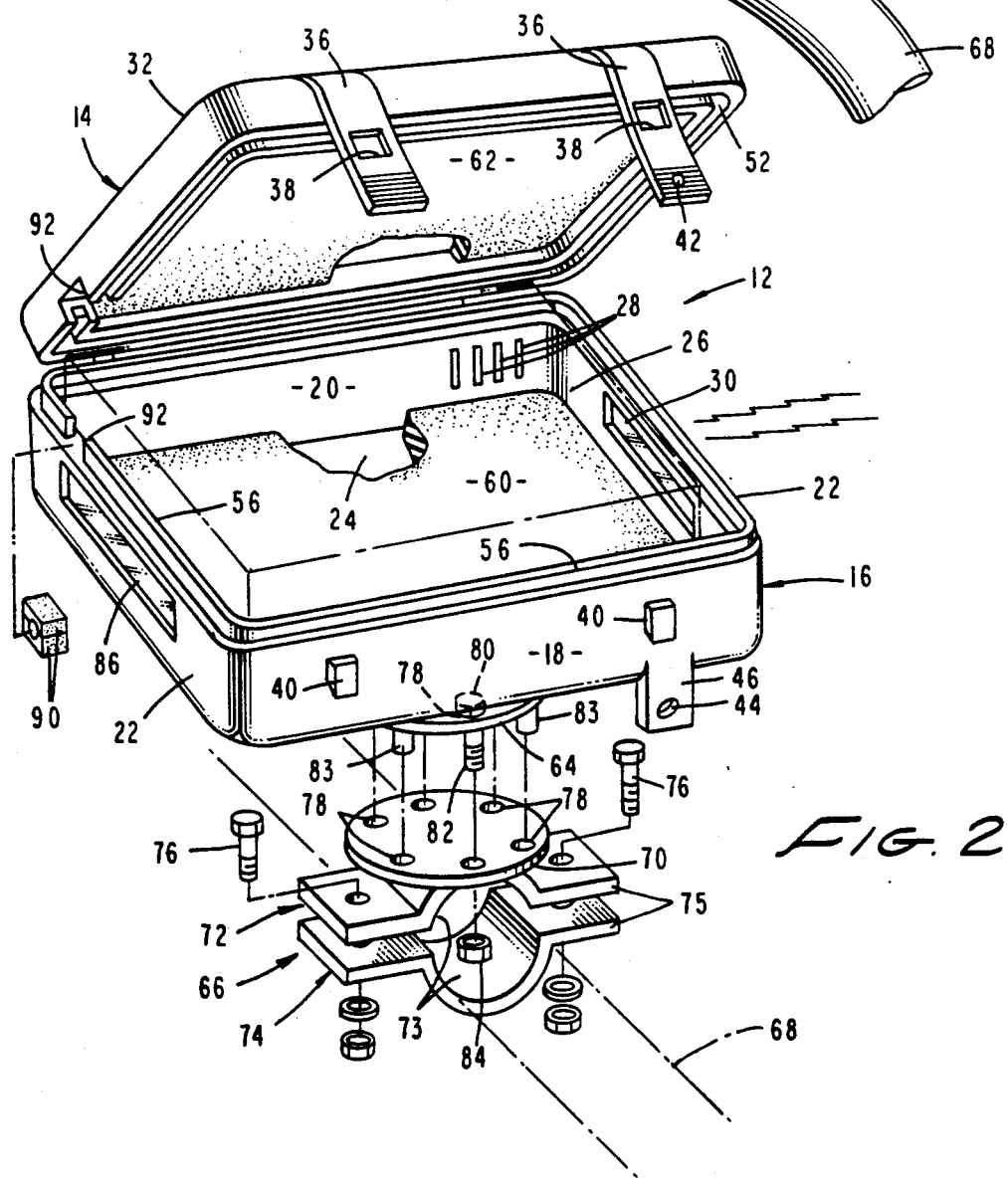
FIG. 2 is an exploded, generally perspective view of the apparatus showing the housing in an open configuration.

Referring to the drawings and particularly to FIGS. 1, 2 and 3, the apparatus of the invention for adjustably mounting an electrically operated, compact radar detector unit on a motorcycle is generally designated by the numeral 12. In one form of the invention the apparatus comprises a hollow housing 14 for removably receiving a small, compact, commercially available radar detector unit of the character previously discussed herein. The housing includes a base portion 16 having interconnected front, back, side and bottom walls 18, 20, 22, and 24 respectively defining an internal chamber 26. Side wall 22 is provided with means penetrable by audio signals emitted by the radar detector unit. In the embodiment of the invention shown in the drawings this means comprises a plurality of thin wall plastic segments 28 which are sealably mounted within one side wall 22 designated in FIG. 2 as 22a and which offer minimum resistance to the passage of sound waves. As indicated in FIG. 2, front wall 18 is provided with window means shown here in the form of a radar transparent glass or plastic window 30 which is sealably mounted within wall 18 for the passage of radiation emitted by a remote radar device such as a police radar.

A cover means is connected to base portion 16 for closing interior chamber 26. The cover means is here provided in the form of a closure lid 32 movable between a first open position shown in FIG. 2 and a second closed position shown in FIG. 1, wherein internal chamber 26 is hermetically sealed relative to atmosphere. As best seen by referring to FIG. 4, lid 32 is connected to side wall 22a by means of a hinge assembly 34 of standard design.

A pair of locking straps 36 are affixed to lid 32 and extend downwardly therefrom. Each of the locking straps 36 is provided with a rectangular aperture 38 which is adapted to be closely received over locking protuberances 40 formed on side wall 22. As indicated in FIG. 5, each of the protuberances 40 is provided with a downwardly slopping lower wall 40a which is closely receivable within apertures 38 provided in straps 36. With this arrangement lid 32 will be held securely in a closed sealing relationship with base portion 16 when the straps are interlocked with protuberances 40. One of the straps, designated as 36a in FIG. 1, is provided with a second aperture 42 which is movable into alignment with an aperture 44 provided in a downwardly extending leg 46 formed on base 16. When the cover means is in its second closed position, as shown in FIG. 1, apertures 42 and 44 are in alignment and will receive the hasp 48 of a standard padlock 50.

In order to hermetically seal chamber 26, sealing means are provided for sealably interconnecting base portion 16 and lid assembly 32, when the latter is in a second closed position. In the embodiment of the invention shown in FIGS. 1 and 2, the sealing means comprises a peripherally extending groove 52 formed in lid 32, a resiliently deformable rubber sealing member 54 closely receivable within groove 52 (FIG. 4) and an upstanding lip 56 which circumscribes base portion 16. When lid 32 is in the closed position, lip 56 is closely receivable within groove 52 and is movable into pressural engagement with sealing member 54. With this construction, when lid 32 is closed, interior chamber 26 will be protected from moisture and dust which could be detrimental to the radar detection unit mounted within chamber 26.

Disposed within chamber 26 is shock absorbing means for cushioning the radar detector unit against the shock and vibration inherent in the operation of the motorcycle. In the present form of the invention, the shock absorbing means comprises a generally planar shaped cushioning member 60 disposed within interior chamber 26 and a resiliently deformable, generally planar cushioning member 62 disposed within cover means, or lid 32, in the manner best seen by referring to FIGS. 2 and 3.

Forming an important aspect of the apparatus of the present invention, is mounting means operably associated with hollow housing 14 for mounting the hollow housing on a motorcycle handlebar in a plurality of directional orientations. In the embodiment of the invention shown in FIGS. 2, 3 and 6, the mounting means comprises a first generally planar, circular member 64, a clamping assembly 66 removably connected to the handlebars 68 of the motorcycle and a second generally planar, circular shaped member 70 interconnected to clamping assembly 66. Clamping assembly 66 comprises upper and lower members 72 and 74 each of which includes a central concave portion 73 which circumscribes the handlebars and outwardly extending flange portions 75. Flange portions 75 are interconnected by fasteners such as bolts 76 (FIG. 2) which secure upper and lower members 72 and 74 in clamping engagement with the motorcycle handlebar.

Each of the plates 64 and 70 is provided with circumferentially spaced apertures 78 which can be selectively aligned to position hollow housing 14 in various orientations with respect to the handle bar 68. Receivable within the apertures 78 provided in plate 64, a pair of fasteners or bolts 80 each having downwardly extending, externally threaded shank portions 82. Shank portions 82 selectively are receivable within a pair of oppositely disposed apertures 78 provided in plate 70, and are adapted to receive locking nuts 84 (FIG. 3), which, when tightened on shank portions 82, securely join plates 64 and 70 in the manner shown in FIG. 6. As best seen in FIG. 6, a pair of downwardly extending locating studs 83 are provided on plate 64. Studs 83 are selectively receivable within selected apertures 78 in plate 70 and, in cooperation with bolts 80, locate plate 64 relative to plate 70.

In using the apparatus of FIGS. 1 through 8, lid 32 is raised into the position shown in FIG. 2 and the commercially available radar detector unit is inserted within chamber 26. As best seen in FIGS. 1 and 8, the power cord P of the detector unit D is passed through cooperating sealing members 90 positioned within slots 92 formed in wall 20 and in lid 32. Lid 32 is then closed, encapsulating the radar detector unit between the cushioning members 60 and 62 and encapsulating power cord P between sealing members 90. Apertures 38 of locking straps 36 are next positioned over protuberances 40 so as to bring the peripheral lip 56, of the lower portion of the housing, into sealing engagement with the sealing means, or resiliently deformable member 54. When desired the padlock 50 can be used to lock the housing in the closed position as shown in FIG. 1.

After lid 32 is secured in the closed position, the clamping assembly 66, along with second plate 70, is then secured to the handlebars in the manner shown in FIGS. 3 and 6. This done, housing 14 is positioned in the desired angular orientation with respect to handlebars 68 and shank portions 82, of bolts 80, are inserted into selected apertures 78 of plate 70. As illustrated in FIG. 7, various angular orientations of the housing with respect to the handlebars 68 can be achieved by rotating housing along with plate 64 with respect to plate 70. This ability to angularly orient the housing permits the apparatus to be used with motorcycles having handlebars with widely differing rake angles.

When the apparatus is secured to the motorcycle handlebars as shown in FIG. 1, a viewing means or window 86, is provided in wall 20 to permit the rider to view the visual signals emitted from the radar detector unit enclosed within chamber 26. Window 86 is sealably mounted in wall 20 so as to maintain the integrity of the hermetic seal of chamber 26.

Turning now to FIG. 9, an alternate embodiment of the invention for mounting the radar detector unit on the fairing of a motorcycle is there shown. In this form of the invention, the hollow housing and shock absorbing means is identical to that previously described herein and like numerals are used to identify like components. The mounting means, which is adapted to mount the hollow housing on the motorcycle fairing F, comprises a mounting web 100 connected proximate its upper end to bottom wall 24 and connected proximate its lower end to a plate 102. Plate 102 is provided with a plurality of apertures 104 which receive connectors, or bolts 106, which connect the plate to the motorcycle fairing.

Turning to FIGS. 10, 11 and 12, another alternate embodiment of the invention is there illustrated. This form of the invention comprises a hollow housing 114 of slightly different design for removably receiving a radar detector unit of the character previously discussed herein. The housing includes first and second cooperating enclosure portions, the first, or outer enclosure portion 116, having interconnected front, side, top, and bottom walls 118, 122, 123 and 124 respectively, defining an internal chamber 126.

As indicated in FIG. 11, front wall 118 is provided with window means shown here in the form of a radar transparent glass or plastic window 130 which is sealably mounted within wall 118 for passage of radiation emitted by a remote radar device such as police radar.

Hollow body 114 also comprises a second enclosure portion 132 having interconnected rear, side, top and bottom walls 134, 136, 138 and 140 respectively. Rear wall 134 is provided with means penetratable by warning signals emitted by the radar detection unit (FIG. 10) shown here as a window 135 mounted within wall 134. Second enclosure portion 132 is telescopically receivable within first enclosure portion 116 and, in turn, is adapted to telescopically receive the radar detector unit 12 in the manner best seen in FIGS. 11 and 12. When second enclosure portion 132 is moved from a first separated position into a second fully telescoped position as shown in FIGS. 11 and 12, the radar detector unit D is enclosed within the first and second cooperating enclosure portions 116 and 132.

In order to hermetically seal the detector unit from atmosphere, sealing means are provided for sealably interconnecting first and second enclosure portions 116 and 132, when the latter portion is in the second position. In the embodiment of the invention shown in FIGS. 11 and 12, the sealing means comprises a pair of spaced apart grooves 144 formed in and circumscribing second enclosure portion 132 (FIGS. 11 and 12). Resiliently deformable elastomeric O-rings 146 and 148 are closely receivable within grooves 144. With this construction, when second enclosure portion 132 is in its second, fully telescoped position, the detector unit will be protected from moisture and dust which could be detrimental to effective operation of the unit.

Disposed within the interior of second enclosure portion 132 is shock absorbing means for cushioning the radar detector unit against the shock and vibration inherent in the operation of the motorcycle. In the present form of the invention, the shock absorbing means comprises cushioning member 150 disposed within the interior of second enclosure portion 132 and adapted to completely surround the detector unit D.

As in the previously described embodiments of the invention, mounting means operably associated with hollow housing 114 are provided for mounting the hollow housing on a motorcycle. The mounting means are identical to those previously described herein and are of two types, one for mounting the housing on the motorcycle fairing 100 and the other for mounting the housing on the handlebars 68 of the motorcycle. The latter form of mounting means is illustrated in FIGS. 2, 3 and 6 and functions in the manner previously described. The other form of mounting means for mounting the housing on the fairing F is illustrated in FIG. 9. The details of construction of these two mounting means will not be repeated here. Since, save for the fact that the first member 64, (web 100 in the case of the fairing mount) which is affixed to the hollow housing is here affixed to the bottom wall of the first enclosure portion 116, rather than to bottom wall of base portion 16 in the earlier-described embodiments, the construction and operation of the mounting means is identical to that previously described.

In using the apparatus of the invention illustrated in FIGS. 10 through 12, the commercially available radar detector unit D is first inserted into the interior of second enclosure portion 132 so that it is fully cushioned by member 150. As best seen in FIG. 12, the power cord P of the detector unit D is passed through a tubular channel 152 which is disposed between the inner wall of enclosure portion 116 and the outer wall of enclosure portion 132. Channel 152 not only protects the power cord but also, in cooperation with O-rings 146 and 148, functions to seal the detector against moisture and dust.

To releasably lock the enclosure portion 116 and 132 together, the opposite sidewalls 122 of first enclosure portion 116 are provided with apertures 154 which are constructed and arranged to receive outwardly extending resiliently deformable locking tabs 156 provided on the opposite sidewalls 136 of second enclosure portion 132 (FIG. 12). With this construction, as portion 132 is inserted into portion 116 and moved into the second position, resilient tabs 156 will first deform inwardly relative to sidewalls 136 and then will spring outwardly into apertures 154 thereby locking portion 132 against removal from portion 116. In order to remove portion 132, tabs 156 need only to be pressed inwardly to a position wherein they will clear the leading edges 154a of slots 154.

A downwardly depending locking wall 158 provided on portion 132 engages a mating locking wall 160 provided on enclosure portion 116 when portion 132 is fully inserted to its second position (FIG. 11). These locking walls are apertured to receive securement means, shown here as a conventional padlock 161, so that the first and second enclosure portions can be secured together to prevent unauthorized removal of the detector unit.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for adjustably mounting on a motorcycle having handlebars an electrically operated, compact radar detector unit, comprising:
   (a) a hollow housing for removably receiving the radar detector unit, said housing comprising:
      (i) a base portion, including interconnected front, back, side and bottom walls defining an interior chamber, one of said walls having means penetrable by audible signals emitted by the radar detector unit, one of said walls having cord receiving means for receiving the power cord of the radar detector unit, and said front wall having window means for passage of radiation emitted by a remote radar device;
      (ii) cover means connected to said base portion for movement between a first open position and a second closed position closing said interior chamber;
      (iii) sealing means for sealably interconnecting said base portion and said cover means when said cover means is in said second closed position, whereby said interior chamber is sealed with respect to the atmosphere;
   (b) shock absorbing means disposed within said hollow housing for cushioning the radar detector unit against shock and vibration; and
   (c) mounting means operably associated with said hollow housing for mounting said hollow housing on the motorcycle, said mounting means comprising:
      (i) a first member connected to said base portion of said hollow housing;
      (ii) a clamping assembly removably connectable to the handlebars of the motorcycle;
      (iii) a second member connected to said clamping assembly; and
      (iv) interconnection means for adjustably interconnecting said first and second members.

2. An apparatus as defined in claim 1 in which said first and second members are generally planar in shape and in which said interconnection means comprises at least one fastener extending downwardly from said first member.

3. An apparatus as defined in claim 2 in which said second member is provided with a plurality of circumferentially spaced apertures to receive said fastener.

4. An apparatus as defined in claim 3 in which said shock absorbing means comprises a resiliently deformable, generally planar cushioning means disposed within said interior chamber.

5. An apparatus for adjustably mounting on a motorcycle having handlebars an electrically operated, compact radar detector unit, comprising;
   (a) a hollow housing for removably receiving the radar detector unit, said housing comprising:
      (i) a base portion, including interconnected front, back, side and bottom walls defining an interior chamber; one of said walls having means penetrable by audio signals emitted by the radar detector unit; and said front wall having window means for passage of radiation emitted by a remote radar device;
      (ii) cover means connected to said base portion for movement between a first open position and a second closed position closing said interior chamber;
      (iii) sealing means for sealably interconnecting said base portion and said cover means when said cover means is in said second closed position, whereby said interior chamber is sealed with respect to atmosphere, said sealing means comprising a peripherally extending groove provided in said cover means; a resiliently deformable sealing member receivable within said groove; and an upstanding lip provided on said base portion, said lip being closely receivable within said groove and movable into pressural engagement with said sealing member;
   (b) shock absorbing means disposed within said hollow housing for cushioning the radar detector unit against shock and vibration; and
   (c) mounting means operably associated with said hollow housing for mounting said hollow housing on the motorcycle in a plurality of directional orientations, said mounting means comprising:
      (i) a first member connected to said base portion of said hollow housing;
      (ii) a pair of spaced apart bolts extending downwardly from said first member;
      (iii) a connector assembly removably connectable to the handlebars of the motorcycle; and
      (iv) a second generally planar member connected to said connector assembly, said second planar member having a plurality of circumferentially spaced apertures for selectively receiving said bolts.

6. An apparatus as defined in claim 5 in which said back wall of said base portion includes a viewing window for viewing the radar detector unit.

7. An apparatus as defined in claim 6 further including locking means for locking said cover means in said second closed position.

8. An apparatus for mounting a compact radar detector unit having a power cord on a motorcycle having handlebars and a fairing member, comprising;
   (a) a hollow housing for removably receiving the radar detector unit, said housing comprising:
      (i) a first enclosure portion, including interconnected walls defining an interior chamber, one of said walls having window means for passage of radiation emitted by a remote device;
      (ii) a second enclosure portion connected to said first enclosure portion for movement between a first position and a second position closing said interior chamber;
      (iii) sealing means for sealably interconnecting said first and second enclosure portions; when said second enclosure portion is in said second closed portion, whereby said interior chamber is sealed to the atmosphere;
   (b) shock absorbing means disposed within said hollow housing for cushioning the radar detector unit against shock and vibration;
   (c) mounting means operably associated with said hollow housing for mounting said hollow housing on the motorcycle, said mounting means comprising a connector assembly, including a first portion connected to one said wall of said first enclosure portion and a second portion connected to the handle bars of the motorcycle; and (d) interconnection means for interconneting said first and second portions of said mounting assembly in a plurality of orientations.

9. An apparatus as defined in claim 8 in which one of said walls of said first enclosure portion includes a viewing window for viewing said interior chamber.

10. An apparatus as defined in claim 8 further including locking means for locking said second enclosure portion in said second closed position.

11. An apparatus for mounting a compact radar detector unit on a motorcycle having handlebars and a fairing member, comprising;
   (a) a hollow housing for removably receiving the radar detector unit, said housing comprising:
      (i) a first enclosure portion, including interconnected walls defining an interior chamber, one of said walls having window means for passage of radiation emitted by a remote device;
      (ii) a second enclosure portion connected to said first enclosure portion for movement between a first position and a second position closing said interior chamber;
      (iii) sealing means for sealably interconnecting said first and second enclosure portions; when said second enclosure portion is in said second closed portion, whereby said interior chamber is sealed to the atmosphere;
   (b) shock absorbing means disposed within said hollow housing for cushioning the radar detector unit against shock and vibration, said shock absorbing means comprising a first cushioning member disposed in said interior chamber of said first enclosure portion and a second cushioning member disposed in said second enclosure portion;
   (c) mounting means operably associated with said hollow housing for mounting said hollow housing on the motorcycle, said mounting means including a first portion connected to one wall of said first enclosure portion and a second portion connected to the motorcycle.

12. An apparatus as defined in claim 11 in which one of said walls of said base portion includes a viewing window for viewing said interior chamber.

13. An apparatus as defined in claim 11 further including locking means for locking said second enclosure portion in said second closed position.

* * * * *